March 26, 1940.  O. W. PINEO  2,194,910
SPECTROPHOTOMETER
Filed Sept. 7, 1938
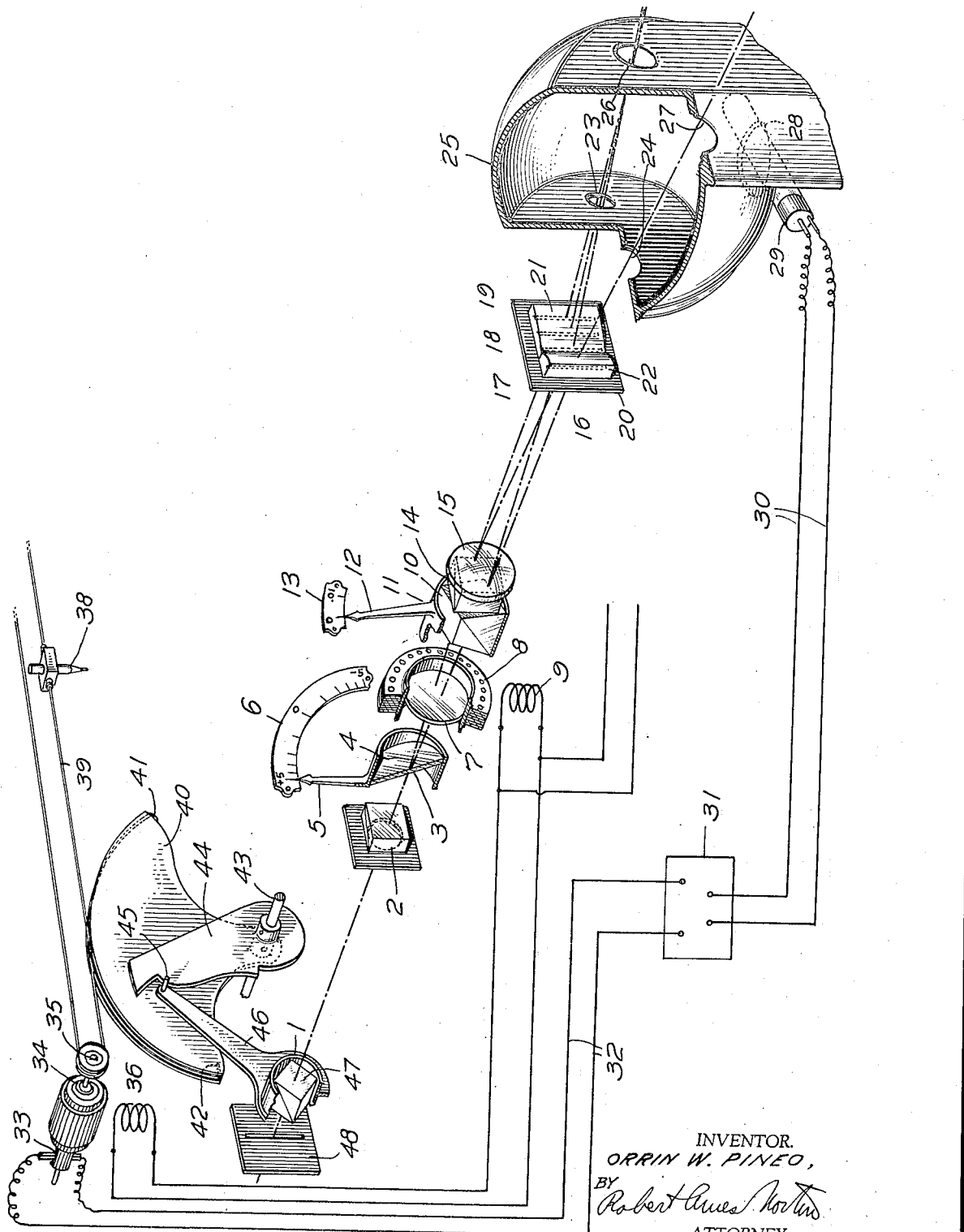
INVENTOR.
ORRIN W. PINEO,
BY Robert Ames Norton
ATTORNEY.

Patented Mar. 26, 1940

2,194,910

UNITED STATES PATENT OFFICE 2,194,910

SPECTROPHOTOMETER

Orrin Weston Pineo, Milo, Maine, assignor, by mesne assignments, to American Cyanamid Company, New York, N. Y., a corporation of Maine Application September 7, 1938, Serial No. 228,736

6 Claims. (Cl. 88—14)

This invention relates to recording spectrophotometers of the flickering beam type, and more particularly to recording spectrophotometers in which photometering is effected by varying the polarization of light and the movement of the polarizing element is caused to actuate a recording element through a suitable drive.

The flicker type of spectrophotometer has achieved great commercial success and the machines which are at present on the market utilize the optical and recording system described in my prior Patent No. 2,107,836 dated February 8, 1938. While this type of spectrophotometer has achieved great practical success, it presents certain difficulties. The flickering is effected by rotation of a polarizing prism through which pass two divergent beams of light, plane polarized at right angles to each other. The flickering beams are then used respectively to illuminate a standard and sample. The total light from sample and standard is integrated and impressed upon a photocell. The plane of polarization of the beams rotates, and since many materials are not uniform in their behaviour to plane polarized light in different planes of polarization, the results are sometimes affected by the nature of the material and its orientation.

In order to overcome the above optical difficulty, a more recent development has been made which is described in my Patent No. 2,126,410 dated August 9, 1938 in which flicker mechanisms using polarized light are employed wherein the plane of polarization of the beams striking sample and standard is not rotated.

Even with the improved optics of the last mentioned spectrophotometer, there is still a practical difficulty. A certain amount of stray light may enter the integrating apparatus, and, in the case of a sample which has zero transmission or zero reflectance, it is possible for a small amount of stray light in the beam encountering the standard to cause the photometering element to pass through zero azimuth; in other words, to assume a slight negative value. This results in the apparatus running away because once the photometering element has passed the zero azimuth, the driving force which it receives from the amplified photocell current causes it to run away from balance and not toward balance. This has necessitated the provision of a safety switch.

According to the present invention, a portion of the beam which normally strikes the sample is deflected so that it strikes the standard. This may be effected in photometers of the type described in my Patent No. 2,126,410 by introducing a suitable prism such as a Wollaston prism between the polarizing prism and the sample and standard so that a small percentage, for example 1%, of the beam which normally strikes the sample encounters the standard. As this light is out of phase with that of the beam normally striking the standard, a corresponding amount of light must be in the beam striking the standard in order that the combination shall have no flickering component. Thus, for example, if 1% of the sample beam strikes the standard, the zero reading for the machine would require a corresponding definite amount of light to strike the standard, and a small amount of other stray light which would otherwise cause the photometering prism to pass to negative value will merely decrease the amount now replacing the former zero amount. Thus, it is not necessary to provide for any safety switch since the device will always read with a positive value of the photometering prism. A further advantage is that the actual transmission of a very dark sample can be plotted, uncomplicated by any switch. The characteristics which are introduced by this optical system permit adjustment of a recording spectrophotometer so as to compensate for any known amount of surface reflectance of the sample, thus giving readings for true body reflectance when this is desired.

The invention has been described in conjunction with a flickering beam spectrophotometer using polarized light because this type is the one which has achieved the greatest practical commercial success. However, the invention is not limited to such a type and the same results can be obtained, for example, with a type of photometer using mechanical flickering with an adjustable opening type of photometer. Such a device is described in the Hardy and Cunningham Patent No. 1,806,199. In the case of a mechanical photometering element, it is necessary only to split the beam striking the sample and cause a component thereof to strike the standard. As a matter of fact, the splitting of the beam striking the standard as described specifically in conjunction with machines using polarization to produce flicker is not theoretically necessary. Actually, both beams will be split since the same Wollaston prism has to be placed in both beams in order to cancel out effects due to absorption in passing through the prism. The splitting of the beam which normally strikes the standard into two components, therefore, is not essential to the operation of the invention which requires merely that the sample beam be split with one component being directed onto the standard.

The invention will be described in greater detail in conjunction with the drawing which is a diagrammatic perspective elevation, partially broken away, of a spectrophotometer embodying the improvements of the present invention.

The optical equipment of the spectrophotometer includes a photometer prism 1, a Wollaston prism 2, and an eccentrically mounted plate 3 of glass, quartz, or other transparent material mounted in a ring 4 carrying a pointer 5 which indicates on a non-linear scale 6. The flickering mechanism is shown as a rotating half-wave plate 7 rotated by the motor 8 provided with a field 9. The flickering beams then pass through a polarizing prism 10 which is mounted in the adjustable sleeve 11 carrying a pointer 12 indicating on a small scale 13. Immediately behind the polarizing prism is a Wollaston prism 14 followed by a converging lens 15. The lens focuses beams on the slits 16, 17, 18 and 19 of the plate 20. A lens 21 is placed behind the slits 17—19, a smaller lens 22 behind the slit 16. The beams leaving these lenses pass through two openings 23 and 24 in an integrating sphere 25 which is also provided with openings 26 and 27 registering respectively with the openings 23 and 24. In the bottom of the sphere 25 is an opening 28 below which is mounted a photo-cell 29.

Output current of the photo-cell 29 passes through the wires 30 into a high gain audiofrequency amplifier 31, the output of which passes through the wires 32 into the commutator 33 of a motor 34 having a drive pulley 35. The field 36 of the motor 34 is fed with alternating current, the same as that feeding the field 9.

The pulley 35 drives a cable 39 carrying an indicating device 38 and also being fastened at each end to a circular cam 40, the fastenings being shown at 41 and 42, respectively. The circular cam drives a shaft 43 on which is mounted a cam 44 which engages a cam follower 45 on an arm 46 integral with a hollow sleeve 47 carrying the photometric prism 1. The exit slit of a monochromator (not shown) appears on the drawing as 48.

The operation of the spectrophotometer is as follows: light of a narrow spectral band leaving the slit 48 passes through the photometric prism 1 which is an ordinary Rochon or Nicol prism which serves to polarize the light. The beam of polarized light then passes through the Wollaston prism where it is separated into two diverging beams, polarized at right angles to each other. These, in turn, pass through the plate 3, the axis of which can be tilted through an angle of 15° in horizontal or vertical plane by rotating the sleeve 4. The two beams then pass through the plate 7 which is driven by the synchronous motor 8. The number of the poles of the synchronous motor is so chosen that the frequency with which the beams flicker from maximum to minimum is the same as the frequency of the alternating current in the field 9 of the synchronous motor 8. The flickering beams then pass through a stationary polarizing prism 10 which can be rotated through a small angle by rotating the hollow sleeve 11. The extent of the rotation is indicated by the pointer 12 on the scale 13. A Wollaston prism 14 follows the stationary polarizing prism 10 and serves to split each of the two beams into two diverging beams polarized at right angles to each other. The four beams thus formed are brought to focus by the lens 15 as four images of slit 48 at the slotted plate 20. The lens 21 which covers slits 17–19 causes the beams from all three to be focused on the plane of the opening 26 and the smaller lens 22 causes the beam passing through the slit 16 to pass through the openings 24 and 27. The three beams from slits 17—19 likewise pass through the opening 23 in the integrating sphere 25.

If sample and standard are placed respectively at 24 and 23 for transmission measurements, or at 27 and 26 for reflectance measurements, it will be apparent that not only do both components of one beam pass through the standard but one component of the other beam also. The proportion of the two components of each beam produced by the Wollaston prism 14 is determined by the amount of rotation of the polarizing prism 10 and can be read off on the scale 13. Let us assume that the prism 10 is rotated until the pointer 12 is at point .01 on scale 13 which with a proper choice of scale would indicate that the component of each beam passing respectively through slits 17 and 18 are .01 or 1% of the total beam, the other 99% of each beam respectively passing through 16 and 19. In other words, the standard will be illuminated by the beam passing through the slit 19 which contains 99% of the light in the original flickering beam, the component passing through slit 17, which is 1% thereof, plus the 1% of the other beam passing through slit 18. Since this latter component is in opposite phase to the other two components, if the photometric prism 10 is set so that no light is present in the flickering beam, two components of which pass through slits 17 and 19, the standard would still be illuminated with 1% of the light striking the sample. In the case of a sample of zero transmission or zero reflectance, the beam normally intended for the standard would have to pass sufficient light to neutralize the effect of the 1% of the beam illuminating the sample which is deflected so as to strike the standard. In other words, a zero setting of the photometric prism is one which would permit 1% of the beam to strike the standard instead of a setting with zero illumination of the standard as with the ordinary flickering system.

Since the setting corresponding to zero reflectance or transmission of the sample requires 1% of light on the standard, there is no danger of the photometric prism being turned past the setting for zero illumination on the standard and there is hence no danger of the device overshooting.

The operation of the photometric prism is the same as in the spectrophotometer described in my Patents No. 2,107,836 and No. 2,126,410 referred to above. That is to say, if there is any flickering light in the integrating sphere, this passes through the opening 28 into the photocell and is transformed into alternating electric current which is fed into the input of the high gain amplifier 31 and the output current is fed into the field 36 of the motor which drives the cam 44 through the cable as described above, and in turn, rotates the prism 1. The operation is the same as in my former patents except that the shape of the cam 44 has to be slightly different because of the change of setting of the photometric prism for zero transmission or reflectance of the standard. The cam profile, in my former patents, is so cut that the angle $\alpha$ of rotation of the photometric prism is connected with plotted reflectance $r/R$ as follows:

$$\tan^2\alpha = r/R$$

where $r$ is the reflectance or transmission of the sample and $R$ is the reflectance or transmission of the standard.

The cam profile in the present invention is adapted to plotting body reflectance which is of primary importance in connection with the composition of samples. The total reflectance $r$ is related to the body reflectance $b$ and surface reflectance $s$ as follows:

$$r = s + (1-s)b \qquad \text{Eq. 1}$$

The flicker vanishes at "balance" when $$\tan^2 \alpha = r \frac{1-\mu}{R}(1-\sin^2 \beta) + \sin^2 \beta \qquad \text{Eq. 2}$$

Here $\mu$ is a "100% correction" adjustable by plate 3, which is conveniently set so that $1-\mu=R$. The small rotational adjustment of prism 10 is denoted by angle $\beta$. Combining Equations 1 and 2, we have $$\tan^2 \alpha = b[1-(s+\sin^2 \beta - s \sin^2 \beta)] + (s+\sin^2 \beta - s \sin^2 \beta) \qquad \text{Eq. 3}$$

which gives the balance azimuth $\alpha$ of the photometer prism 1 in terms of the desired body reflectance $b$, the known surface reflectance $s$ to be compensated, and the adjustable azimuth $\beta$ of the flicker prism 10. The value of $\beta$ which will be employed to compensate a given value of $s$ depends on the design of the cam profile. In the present invention, the cam is so designed that the photometer prism azimuth $\alpha$ is translated into plotted body reflectance $b$ according to $$\tan^2 \alpha = b(1-B) + B \qquad \text{Eq. 4}$$

where $B$ is a suitably chosen design constant, of the cam 44. Comparison of Equations 3 and 4 leads to $$\sin^2 \beta = \frac{B-s}{1-s} \qquad \text{Eq. 5}$$

from which is determinable the angle $\beta$ required to compensate a given value of $s$. If values of $s$ up to .01 are to be compensated, B is conveniently set at .01 without introducing the necessity of setting $\beta$ at imaginary angles. By this means of compensating surface reflection, true body reflection is directly plotted by the instrument.

A half-wave plate 7 and polarizing prism 10 are illustrated in the drawing as typical of a type of flickering mechanism to which the present invention can be applied. Any other type of flickering mechanism which gives beams of plane polarized light in which the plane of polarization does not rotate can be used in place of this structure. Thus, for example, the other types of flickering mechanism employing Kerr cells, and magnetic flickering devices which are described in Patent No. 2,126,410 may be substituted for the half-wave plate 7. The operation of the spectrophotometer is identical. The invention is illustrated with a cam which plots reflectance in percentage. Any other type of cam may be substituted such as, for example, those which plot functions of reflectance or transmission which produce curves invariant in shape with concentration. Such cams are described and claimed in my copending application, Serial No. 158,821, filed August 12, 1937.

What I claim is:

1. In a spectrophotometer having means for mounting a sample and a standard, means for illuminating them by beams flickering in opposite phase, means for varying the relative intensities of the beams for photometering until the integrated light from sample and standard shows no fluctuations at flicker frequency, the improvement which comprises the addition of means for splitting the sample beam into two beams, means for directing onto the standard the beam normally striking the standard and one of the components of the beam normally striking the sample, and means for directing onto the sample the remaining component of the sample beam.

2. A spectrophotometer according to claim 1 in which the beams illuminating sample and standard are beams of polarized light.

3. In a spectrophotometer having means for mounting sample and standard, means for illuminating them by means of polarized light flickering in opposite phase, means for varying the relative intensities of the beams for photometering until the integrated light from sample and standard shows no fluctuation at flicker frequency, means for integrating the light transmitted or reflected from sample and standard, and means for impressing the integrated light on a photocell, the improvement which comprises means in the path of the two flickering beams capable of splitting each beam into two diverging beams, a plate with four slits interposed between said means and sample and standard, means for focusing each of the four beams on a separate slit in the plate and means between the slit plate and the sample and standard for causing both components of the beam normally striking the standard and one of the components of the beam normally striking the sample to strike the standard and the remaining component of the sample beam to strike the sample.

4. In a spectrophotometer in optical alignment, a source of monochromatic light, a photometering prism capable of plane polarizing said light, means for splitting said polarized light into two diverging beams of light plane polarized at right angles to each other, a flicker device including polarizing means in the path of the two polarized beams capable of causing the beams to emerge therefrom varying in intensity from zero to maximum in opposite phase and plane polarized in a single selected plane, means for rotating the polarizing means in the flicker device through a small angle, stationary means for dividing each of said flickering polarized beams into a pair of divergent beams plane polarized at right angles to each other the relative intensities of the component beams of each pair being dependent on the degree of rotation of said polarizing means, a plate provided with four slits, focusing means for focusing each of four beams onto a separate slit, means for supporting a sample and standard, an integrating sphere illuminated by light from sample and standard, a photocell receiving said integrated light and means controlled thereby for varying the position of the photometering prism until the integrated light from sample and standard shows no fluctuation at flicker frequency, and focusing means for focusing onto the standard both components of the pair of beams normally striking the standard and the lesser component of the other pair normally striking the sample, and additional focusing means to cause the remaining component of the said other pair to strike the sample.

5. A spectrophotometer according to claim 4 in which the flickering device includes a rotating half-wave plate.

6. A spectrophotometer according to claim 4 in which the means controlled by the photocell for varying the position of the photometering prism includes a high gain flicker frequency amplifier fed by the output of the photocell, a motor actuated by the output of the amplifier and driving means connecting the motor to the photometering prism.

ORRIN WESTON PINEO.

CERTIFICATE OF CORRECTION.

Patent No. 2,194,910. March 26, 1940.

ORRIN WESTON PINEO.

It is hereby certified that error appears in the printed specification of the above numbered patent requiring correction as follows: Page 3, second column, line 8, claim 3, for the word "means" read --beams--; and that the said Letters Patent should be read with this correction therein that the same may conform to the record of the case in the Patent Office.

Signed and sealed this 14th day of May, A. D. 1940.

(Seal)

Henry Van Arsdale,
Acting Commissioner of Patents.